Dec. 16, 1924.

W. KRAMER ET AL

CONTROL FOR SPRING MOTOR WINDING MEANS

Filed Sept. 10, 1923

1,519,920

INVENTOR.
W<sup>m</sup> Kramer
W. R. Balke
BY Milton S. Crandall
ATTORNEYS.

Patented Dec. 16, 1924.

1,519,920

UNITED STATES PATENT OFFICE.

WILLIAM KRAMER AND WILLI R. BALKE, OF SIOUX CITY, IOWA, ASSIGNORS OF ONE-THIRD TO MYRON T. SORENSEN, OF SIOUX CITY, IOWA.

CONTROL FOR SPRING-MOTOR-WINDING MEANS.

Application filed September 10, 1923. Serial No. 661,795.

*To all whom it may concern:*

Be it known that we, WILLIAM KRAMER and WILLI R. BALKE, citizens of the United States, and residents of Sioux City, in the county of Woodbury and State of Iowa, have invented certain new and useful Improvements in Controls for Spring-Motor-Winding Means, of which the following is a specification.

Our present invention relates to spring motors, and more particularly those employed in phonographs, the invention having for its primary object the production of an improved means to be interposed in the winding mechanism to prevent winding of the motor spring too tightly.

A further object of the invention is the production of a device for this purpose which may be instantly applied and which is exceedingly simple and inexpensive in manufacture, yet readily adjustable and thoroughly efficient and dependable in operation.

With these and other objects in view the invention, consisting in the construction, combination and novel arrangement of parts, will be fully understood from the following description, reference being had to the accompanying drawings which form a part of this application and in which like characters of reference indicate corresponding parts throughout both views, of which,—

Figure 1:
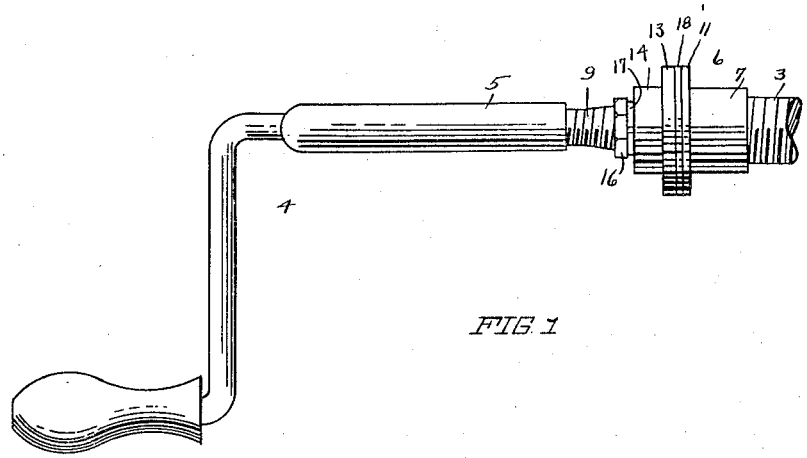
Figure 2:
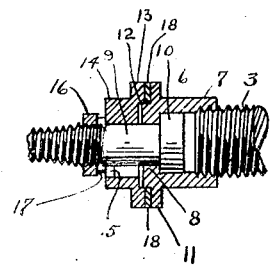

Fig. 1 is a side elevation of a device constructed in accordance with our invention, and Fig. 2 is a longitudinal section thereof.

Referring to the illustrations, the winding shaft of a spring motor is represented, fragmentarily, at 3, and the familiar type of crank is represented generally at 4, and includes a tubular shaft, 5, internally threaded. We provide a frictional clutch mechanism interposed between the crank shaft and the spring motor winding shaft consisting of a fixed clutch member on one of said shafts and a free clutch member on the other of said shafts, the clutch members having frictional coacting faces and so constructed, related and mounted as to permit rotation of the winding shaft through the medium of the crank shaft until the complete winding of the motor spring has created such a resistance against rotation of the winding shaft that the clutch members will slip upon each other.

In the present embodiment the fixed clutch member, represented generally at 6, is mounted on the spring-winding shaft, 3, and consists of a collar, 7, having one end portion threaded to screw onto the shaft, 3, and provided at its other end with a head, 8, through which freely passes a short shaft, 9, having a head, 10, enclosed within the collar, 7, between the head, 8, and shaft, 3. The collar is provided with an annular flange, 11, a distance from the end of the head, the projecting end of the head freely entering an annular recess, 12, in the face of an annular flange, 13, on the collar, 14, of the free clutch member mounted on the shaft, 9, and slidable thereon toward and from the fixed clutch member, on a key or pin, 15, in the shaft, 9. On the side of the collar, 14, remote from the fixed clutch member a nut, 16, is threaded onto the shaft, 9, to hold the clutch members adjustably in frictional engagement with each other, and between the said nut, 16, and the free clutch member we preferably interpose a spring washer, 17, which prevents loosening of the nut, 16. The flanges, 11 and 13, of the clutch members are so related as to coact in abutting frictional engagement through the tightening of the nut, 16, to cause the clutch members to rotate in unison, or rather cause the movable clutch member, 14, to rotate the fixed clutch member, 6, and thereby rotate the winding shaft, 3. Between the coacting faces of the said flanges, however, we interpose a fibre washer, 18, which encircles the projecting end portion of the head, 8.

It will now be clear that the motor spring will be wound through the medium of the crank and clutch mechanism above described, and when the spring has been wound sufficiently tight the increased resistance on the shaft, 3, will cause the free clutch member to slip upon the face of its companion, thereby preventing any damage to the motor if rotation of the crank is continued.

Having thus described our invention, what we claim as new and desire to secure by Letters Patent of the United States, is,—

In a device of the class described, to be used in combination with a phonograph having a threaded winding shaft and an internally threaded winding crank, a sleeve internally threaded at one end to receive the winding shaft, an inwardly extending flange on the other end of the sleeve, a stub shaft extended through the opening encircled by the flange, a head on the stub shaft within the sleeve, in engagement with the flange, the sleeve having an annular depression formed in its outer surface at the end adjacent the flange, a collar received over the stub shaft, a laterally extending annular flange on the collar received in the depression in the sleeve, a friction washer between the collar and sleeve, the end of the stub shaft being threaded to receive the winding crank, a nut on such threaded portion for adjusting the tension between the collar and sleeve, and driving means between the collar and stub shaft.

In testimony whereof we have hereunto set our hands this 5th day of September, 1923.

WILLIAM KRAMER.
WILLI R. BALKE.